(12) United States Patent
Kress

(10) Patent No.: US 10,517,385 B2
(45) Date of Patent: Dec. 31, 2019

(54) ROLLER BRUSH, IN PARTICULAR FOR A CLEANING AND/OR CARE DEVICE AND CLEANING AND/OR CARE DEVICE

(71) Applicant: Markus Kress, Ulm (DE)

(72) Inventor: Markus Kress, Ulm (DE)

( * ) Notice: Subject to any disclaimer, the term of this patent is extended or adjusted under 35 U.S.C. 154(b) by 389 days.

(21) Appl. No.: 15/316,693

(22) PCT Filed: Jul. 7, 2015

(86) PCT No.: PCT/EP2015/065408
§ 371 (c)(1),
(2) Date: Dec. 6, 2016

(87) PCT Pub. No.: WO2016/008763
PCT Pub. Date: Jan. 21, 2016

(65) Prior Publication Data
US 2018/0146773 A1    May 31, 2018

(30) Foreign Application Priority Data

Jul. 16, 2014 (DE) .......... 10 2014 010 692
Apr. 30, 2015 (DE) .......... 10 2015 005 488

(51) Int. Cl.
*A46B 13/00* (2006.01)
*A46B 9/06* (2006.01)
(Continued)

(52) U.S. Cl.
CPC .......... *A46B 13/003* (2013.01); *A01M 21/02* (2013.01); *A46B 5/0095* (2013.01); *A46B 9/026* (2013.01);
(Continued)

(58) Field of Classification Search
CPC . Y10S 15/05; Y10S 15/06; A46B 7/10; A46B 9/00; A46B 9/02; A46B 9/026;
(Continued)

(56) References Cited

U.S. PATENT DOCUMENTS 1,043,533 A  *  11/1912  Nolan et al. ............ E01H 1/042
                                                        15/79.1
1,569,167 A  *  1/1926  Anderson, Sr. ......... A47L 23/06
                                                        15/23
(Continued)

FOREIGN PATENT DOCUMENTS

DE        3100904    *  8/1982
DE        69813358      12/2003
(Continued)

OTHER PUBLICATIONS

International Search Report dated Feb. 23, 2016, in International Patent Application No. PCT/EP2015/065408, filed on Jul. 7, 2015.

*Primary Examiner* — Mark Spisich
(74) *Attorney, Agent, or Firm* — Downs Rachlin Martin PLLC

(57) ABSTRACT

The invention relates to a roller brush, in particular for a cleaning and/or care device, preferably for floor covering in the form of tiles, natural, artificial, blocks of concrete or wood, with a rotationally symmetrical cylinder which comprises a cylinder surface. At least one first plurality of a first bundle of bristles with a first brush and a second plurality of a second bundle of bristles with a second brush is arranged on the cylinder surface. The invention is characterised in that the first bundle of bristles are different from the second bundle of bristles.

16 Claims, 11 Drawing Sheets

(51) Int. Cl.
*A47L 11/24* (2006.01)
*A47L 11/19* (2006.01)
*A46B 9/02* (2006.01)
*A46B 13/02* (2006.01)
*A47L 11/40* (2006.01)
*A46B 5/00* (2006.01)
*E01H 1/05* (2006.01)
*A01M 21/02* (2006.01)
*A47L 11/26* (2006.01)
*E01H 11/00* (2006.01)

(52) U.S. Cl.
CPC .............. *A46B 9/06* (2013.01); *A46B 13/001* (2013.01); *A46B 13/02* (2013.01); *A47L 11/19* (2013.01); *A47L 11/24* (2013.01); *A47L 11/26* (2013.01); *A47L 11/4041* (2013.01); *A47L 11/4069* (2013.01); *E01H 1/056* (2013.01); *E01H 11/00* (2013.01); *Y10S 15/05* (2013.01); *Y10S 15/06* (2013.01)

(58) Field of Classification Search
CPC ........... A46B 9/028; A46B 9/06; A46B 13/00; A46B 13/001; A46B 13/003; A46B 13/005; A46B 13/006; A46B 13/02; A47L 11/18; A47L 11/19; A47L 11/24; A47L 11/4036; A47L 11/4041; A47L 11/4063; A47L 11/4069; E01H 1/056
USPC .......... 15/23, 50.3, 52.1, 79.1, 79.2, 82, 179, 15/181–183, DIG. 5, DIG. 6
See application file for complete search history.

(56) References Cited

U.S. PATENT DOCUMENTS

| | | | | |
|---|---|---|---|---|
| 1,933,492 | A * | 10/1933 | Beach | A47L 11/204 15/389 |
| 1,969,805 | A * | 8/1934 | Lang | B24B 7/188 15/52.1 |
| 2,014,626 | A * | 9/1935 | Moorhead | A47L 11/18 15/52.1 |
| 2,459,007 | A * | 1/1949 | Taylor | A47L 9/0477 15/182 |
| 2,461,369 | A * | 2/1949 | Cameron | A47L 11/24 15/328 |
| 2,842,788 | A | 7/1958 | Rench et al. | |
| 4,153,967 | A * | 5/1979 | Thoma | A46B 9/06 15/181 |
| 4,586,211 | A | 5/1986 | Phillips | |
| 5,231,725 | A * | 8/1993 | Hennessey | E01H 1/056 15/179 |
| 5,452,490 | A * | 9/1995 | Brundula | A47L 9/0477 15/179 |
| 7,152,269 | B1 | 12/2006 | Windel | |
| 2013/0180547 | A1 * | 7/2013 | Kent | A47L 11/282 134/6 |

FOREIGN PATENT DOCUMENTS

| | | | |
|---|---|---|---|
| DE | 102009043167 A1 | | 5/2011 |
| EP | 118315 | * | 9/1984 |
| EP | 2468130 | * | 6/2012 |
| GB | 998043 | * | 7/1965 |
| GB | 1409561 | * | 10/1975 |
| WO | 85/04081 | * | 9/1985 |
| WO | 2004/051001 | * | 6/2004 |

* cited by examiner

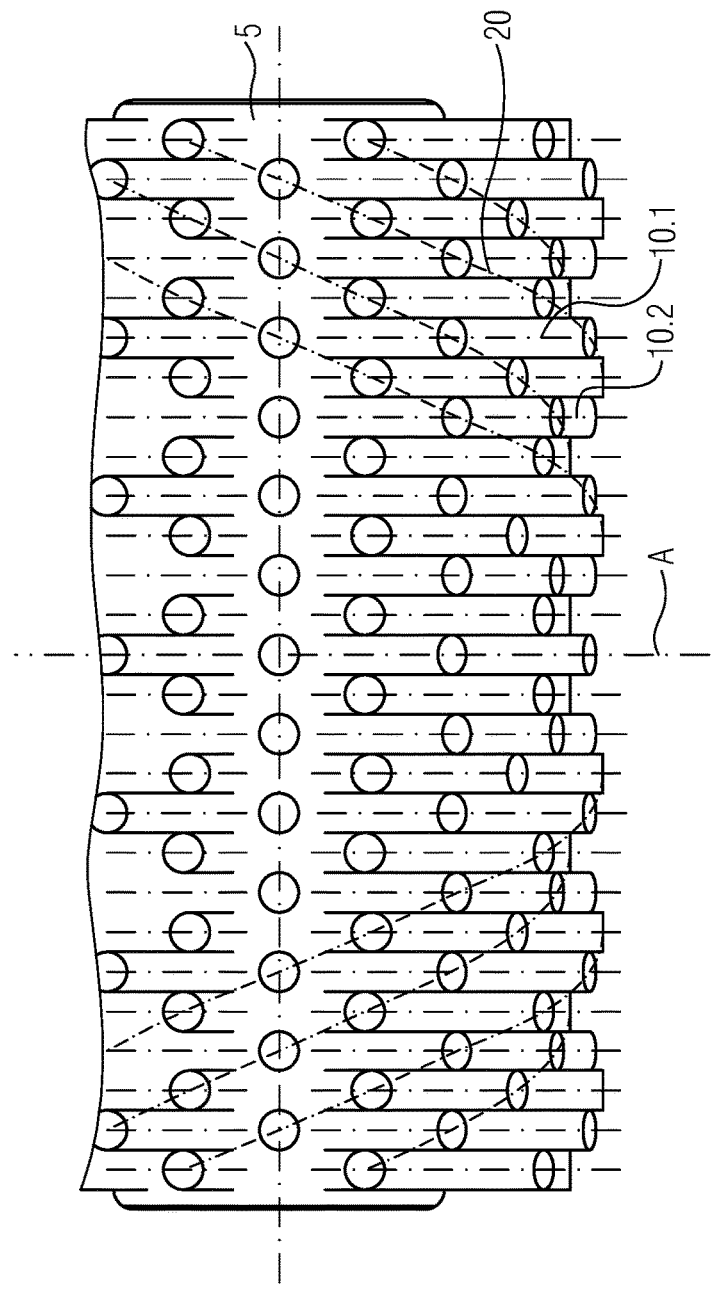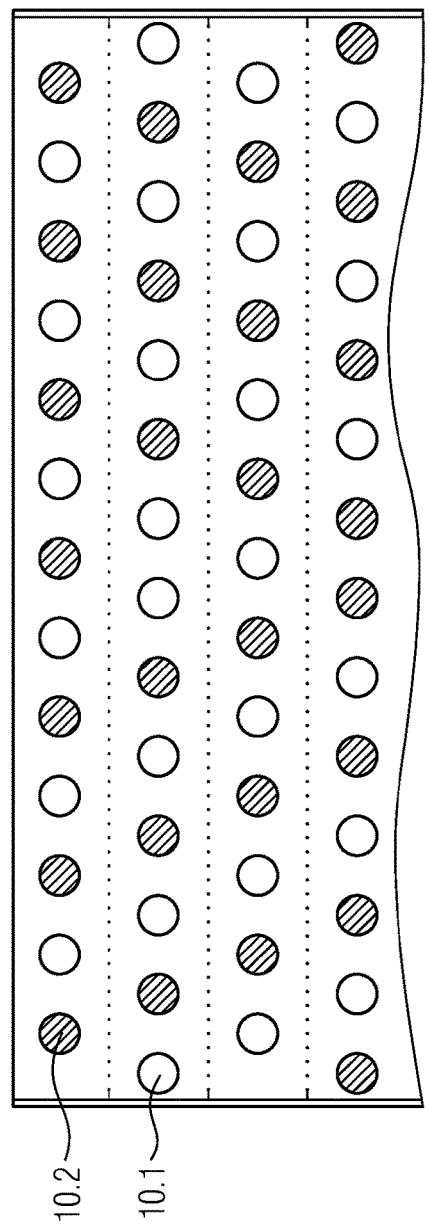
FIG. 3a
FIG. 3b

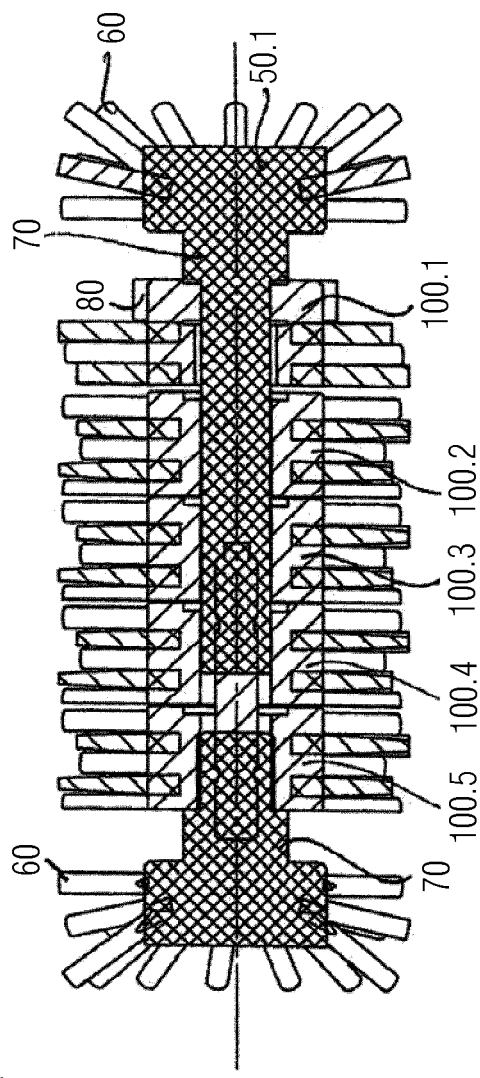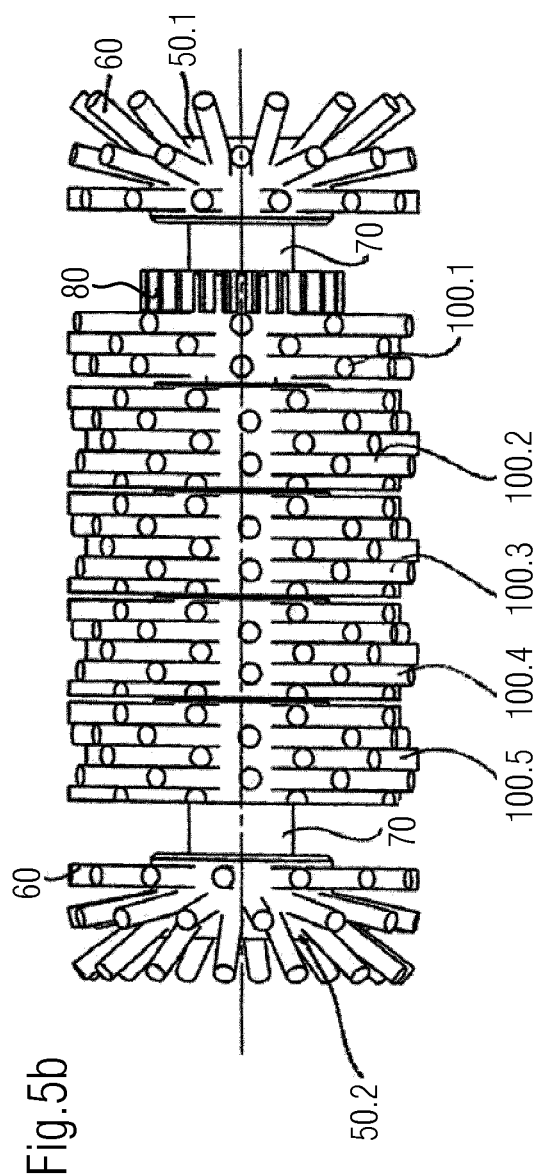
Fig.5a
Fig.5b

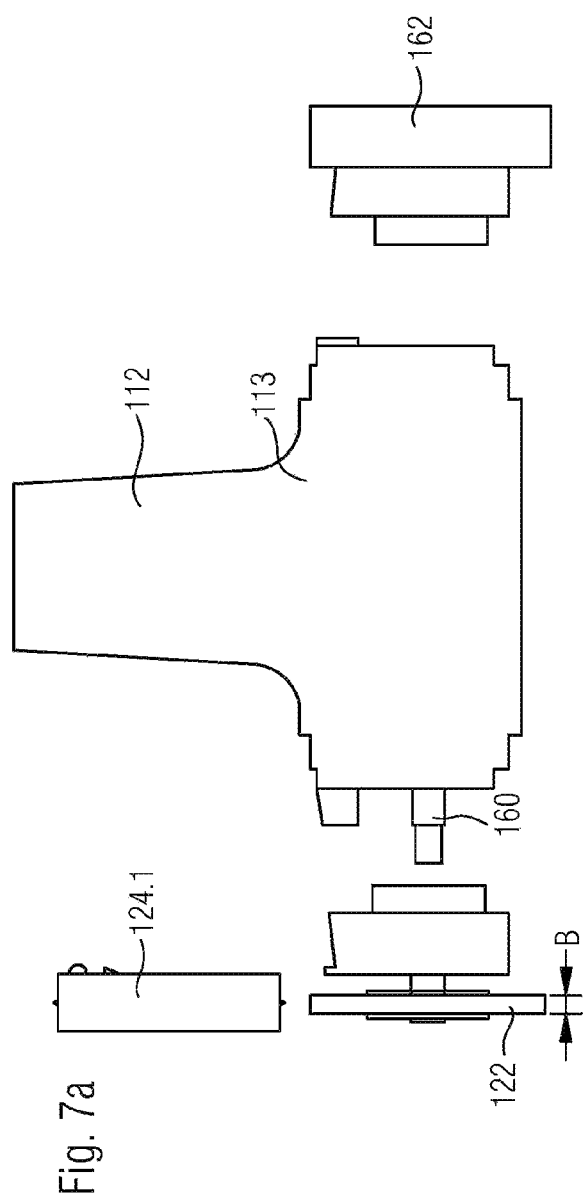
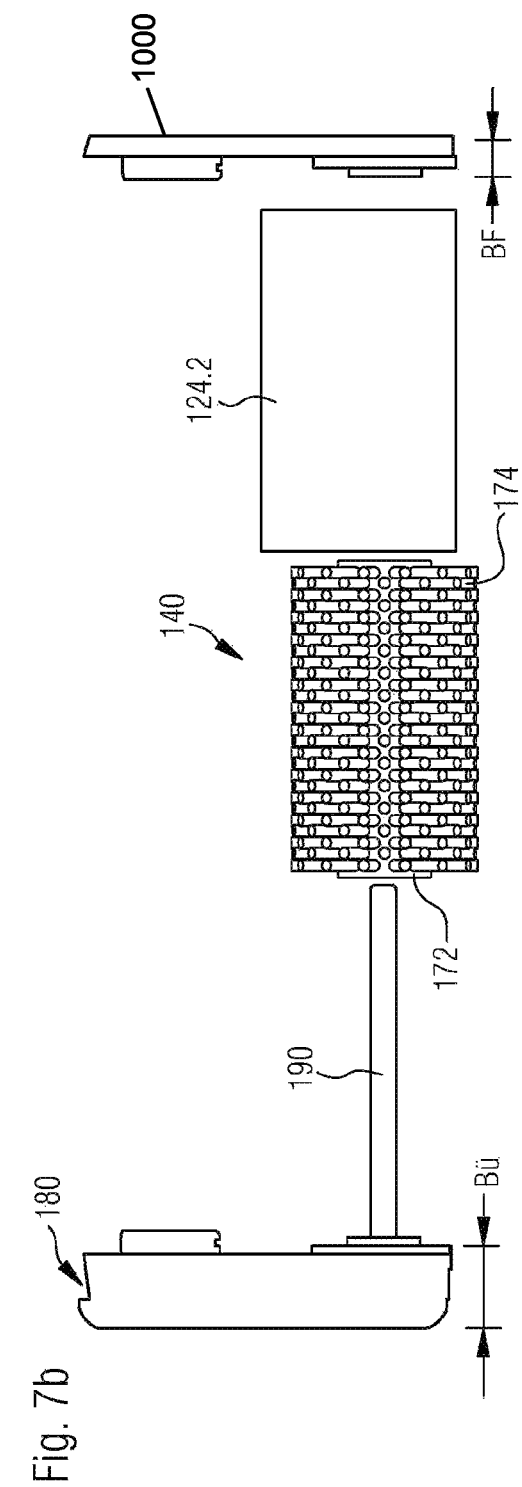

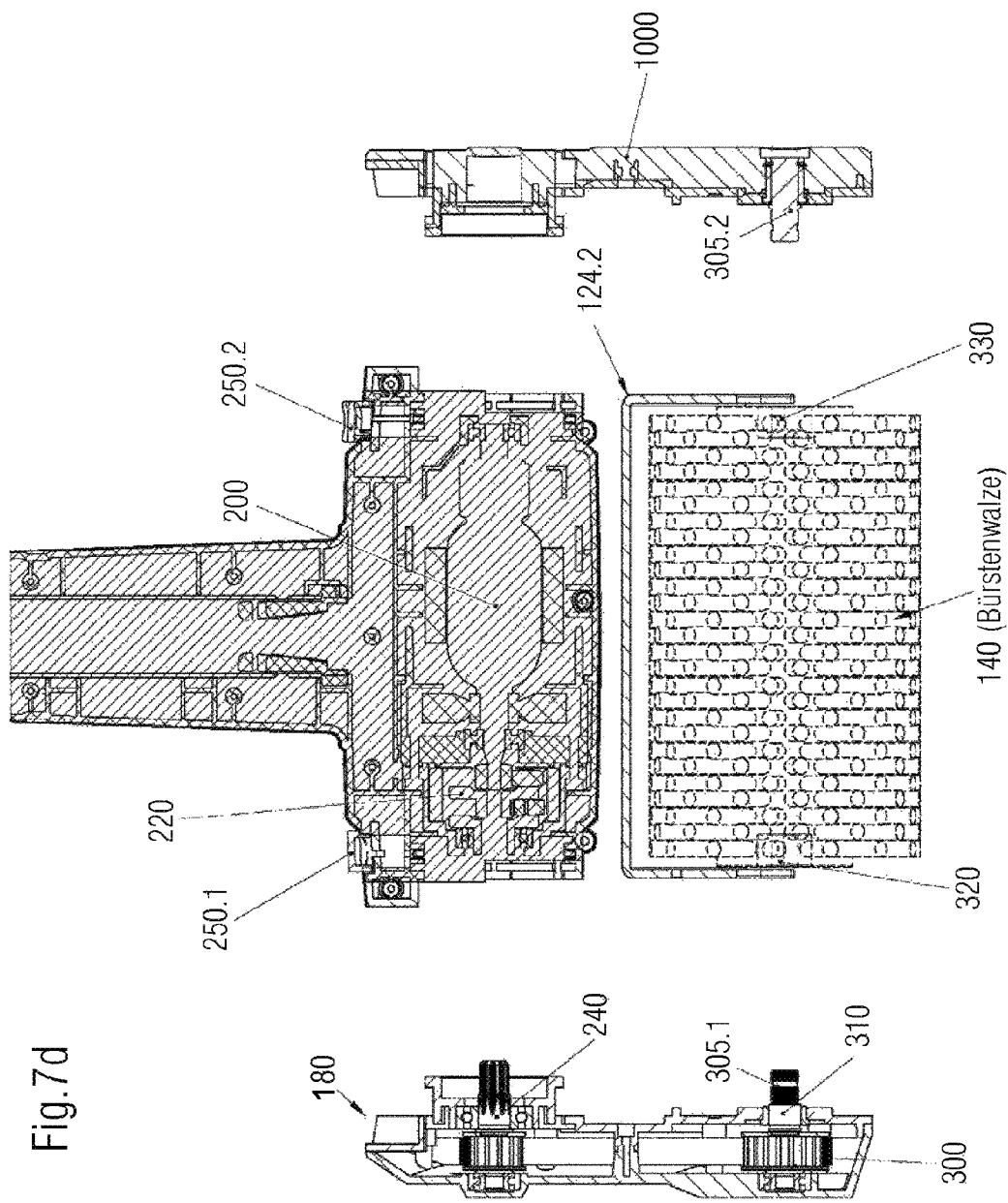

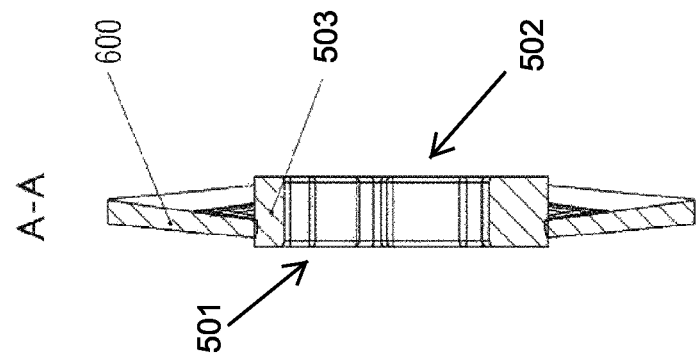
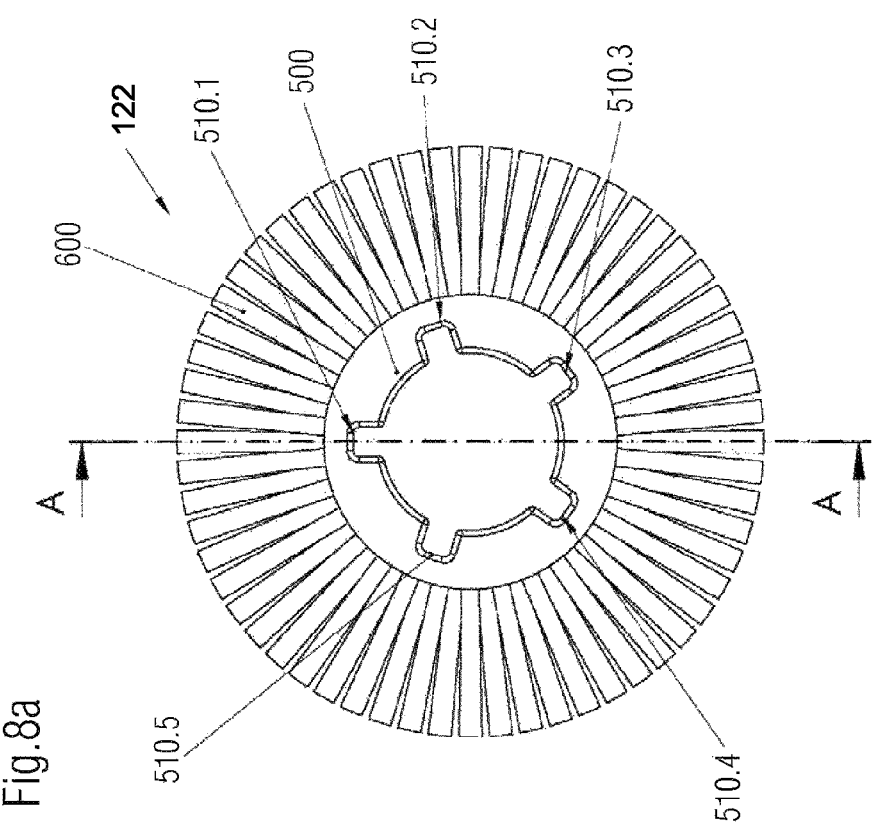

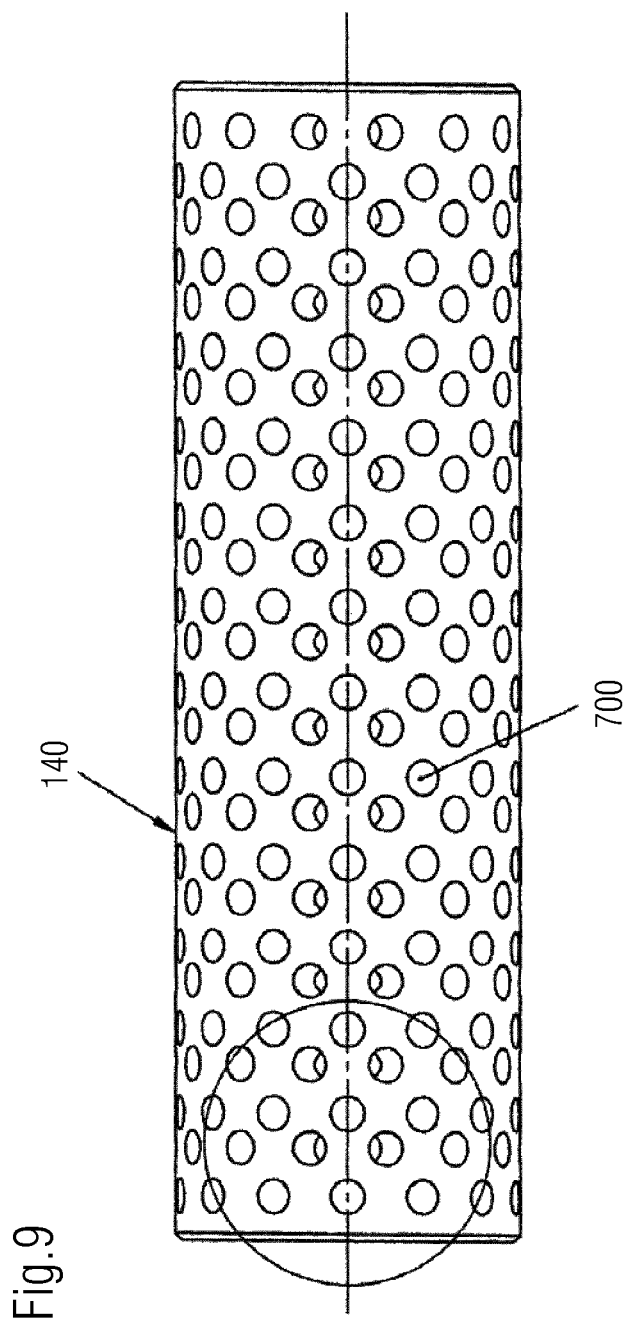

ROLLER BRUSH, IN PARTICULAR FOR A CLEANING AND/OR CARE DEVICE AND CLEANING AND/OR CARE DEVICE

FIELD OF THE DISCLOSURE

The invention relates in a first aspect to a roller brush, in particular for a cleaning and/or maintenance device, preferably for tile, natural stone, artificial stone, concrete block, stone, or wood floor surfaces comprising a rotationally-symmetrical cylinder, which is arranged parallel to the surface to be processed and has a cylinder surface, wherein a first plurality of first bundles of bristles with first bristles and a second plurality of second bundles of bristles with second bristles are arranged on the cylinder surface. Furthermore, the invention relates according to a second aspect to a cleaning and maintenance device, in particular a joint and surface cleaning and maintenance device, in particular a hand-held cleaning and maintenance device for surfaces, in particular floor surfaces, preferably tile, natural stone, artificial stone, concrete block, stone, or wood flooring surfaces, particularly preferably surfaces in the exterior area, for example, plastered surfaces, stone slabs, wood flooring surfaces.

BACKGROUND

Horizontally mounted, rotating brushes are currently preferably used in large cleaning devices, which are used in particular in communal areas. Smaller, preferably hand-held cleaning devices with rotating brushes are used for applications in the household, preferably to free floor surfaces from dirt. Common to all of these devices is that they function like rotating brooms and the cleaning functions essentially to sweep the flooring surface. However, it is not possible to clean heavily soiled surfaces, in particular in the exterior area, or footpaths and terraces with lightly structured surfaces with these types of hand-held cleaning devices or large cleaning devices. In particular, cleaning of concrete, natural stone, smooth tile surfaces, and wooden decks in the exterior area cause problems during the cleaning of the surfaces.

To clean or remove contaminants, like dirt, moss, algae, or even paint from surfaces, e.g., wood, a mechanical floor processing is often required. To clean individual areas of the floor, e.g. the joints, or even areal processing of floor surfaces, it is necessary to work or clean the floors with different processing devices or cleaning and maintenance devices.

It is thus known, for example, that a joint brush may be used for cleaning joints. The joint brush is then, however, designed as an individual device so that processing an area, for example, flooring areas, is not possible for cleaning purposes.

Alternatively to cleaning with a joint brush, cleaning the joints might also be carried out using a high-pressure cleaning. This has the disadvantage, however, that joints may be damaged by the high pressure, water may penetrate into the joints, and dirt particles, like weeds or fibers may be churned up by the high pressure and spray out of the joints.

High-pressure cleaners with a protective cover are known as deck cleaners. These do not damage the wood surfaces; however, the cleaning effect in the grooves of wooden deck profiles is insufficient. In addition, dirt, algae, slime, and impurities are flooded into the joints of adjacent boards along with the sprayed water.

Rotating brushes are known from the prior art for processing surfaces. These have the disadvantage, however, on large surfaces which impede or even completely prevent the penetration of the brushes into irregularities in exposed concrete floors.

As previously described, paths, surfaces, and terraces in the house and garden may be cleaned in various ways. This includes the removal of weeds from joints, as well as moss and stubborn dirt from surfaces. The roller brushes known from the prior art may only sweep the surface dirt together. Sweeping machines are additionally used, which also have rotating circular brushes with an axis of rotation perpendicular to the surface for cleaning the surface. In these systems, the penetration depth is very low, since the brush lies completely on the surface. Joints are not able to be cleaned with such devices.

Using high-pressure cleaners known for joint cleaning, joints and surfaces may be simultaneously processed; however, the joints are completely washed out by the water jet, which is not desired when removing weeds. Furthermore, permanently cast joints are partially washed out be the hard water jet so that seeds may subsequently establish in the joints. A further disadvantage is the contamination of the environment by dirt particles loosened from the joints. Covers may be used to counter this; however, it is then no longer visible how far the jet washes out the joints. In addition, the water consumption is high.

Hand-held electric devices exist for mechanical cleaning of joints, which are generally equipped with a motor arranged at a right angle to a guide rod and a small disk brush, and are known for example from DE 203 21 268 U1 and DE 299 14 790 U1. However, these systems function with a speed of approximately 3000 rpm.

Another relevant document is DE 603 16 021 T2.

The systems functioning at high speeds have the disadvantage that the systems do not allow for a gentle cleaning.

An electrically driven gardening device is known from WO 2006/056313 A, which is used predominantly for cleaning the joints between laid slabs, for cleaning the slabs themselves, and for scarifying. The device shown in WO 2006/056313 A comprises at least one scarifying attachment and a brush wheel which is primarily used for joint cleaning. The scarifying attachment and the brush wheel are screwed onto a shaft and may be exchanged. A brush, in particular a roller brush with rotating brushes, is not shown in WO 2006/056313 A, nor is there any indication in WO 2006/056313 A how flooring surfaces, for example, paths and terraces, may be cleaned.

DE 90 00 712 U1 discloses a weed tiller for cleaning joints. The weed tiller known from DE 90 00 712 U1 is a hand-held cleaning device with a narrow wire brush which is mounted transversely and engages into the joints to be cleaned of weeds. The narrow wire brush, mounted transversely, is driven by a motor fixed on the guide rod. Neither an exchangeability nor a roller brush is shown in DE 90 00 712 U1.

DE 10 2008 006 318 B3 describes a joint cleaning machine for paved surfaces comprising a housing and a rotor located on an axis. Furthermore, the machine comprises an electric motor with a shaft for driving a disk brush and a strut with a handle assigned to the housing. The shaft of the electric motor is arranged in a direction transverse to the vertical plane and inclined in such a way to the drive direction of the machine that the disk brush fixed on the shaft may have a specified inclined position to the joints of the paved surface. The electric motor is mounted on the housing to be movable in the direction of the vertical plane. A roller brush for cleaning areas is likewise not shown in DE 10 2008 006 318 B3.

DE 195 05 156 A1 describes a hand-held motorized universal device, which is particularly suitable for floor cleaning, for removing leaves and snow in the area of the garden and for yard care. It comprises an internal combustion or electric motor and a rod or strut, equipped with handles, which supports a transmission on the lower end which may be equipped with exchangeable tools, rotating around their horizontal axis, in particular with cutting tools and with rotating brooms. The different rotational orientations of the tools required for the various operations are achieved by pivoting the rod or by rotating the rod or the transmission about an angle of 180° to the rod axis.

The broom known from DE 195 05 156 A1 is, however, not comparable to a roller brush, as it may remove loose dirt from a surface, however, it may not clean it. In particular, it is not possible to remove, for example, moss or algae from a wood floor with a broom.

SUMMARY OF THE DISCLOSURE

A first object of the invention is thus to provide a brush which enables, in particular, a sufficient cleaning of heavily soiled surfaces, in particular in exterior areas, when used in a cleaning and/or maintenance device.

According to the invention, this is achieved by a roller brush which has a rotationally-symmetrical cylinder with a cylinder surface, wherein a first plurality of first bundles of bristles with first bristles and a second plurality of second bundles of bristles with second bristles are arranged on the cylinder surface, and the first and second bristles differ from one another.

In one preferred embodiment of the invention, the difference may be carried out in that the first bundle of bristles has different bristles than the second bundle of bristles. In a refined embodiment, it may be provided that the diameters of the first bundle of bristles and the second bundle of bristles are different. Alternatively or simultaneously, it would be possible that the first and second bristles comprise different materials. For example, the first bristles may comprise a metal, e.g. steel wire, and the second bristles may comprise a plastic material, for example polyamide or nylon wire. Alternatively or simultaneously, it would be possible that the bristles have different bristle thicknesses.

It is particularly preferred if the bundles of bristles have different lengths, i.e. a first length for the first bundle of bristles and a second length for the second bundle of bristles, wherein the first length is preferably shorter than the second length.

In particular, the difference between the first and second lengths lies in the range between 50 and 98%, preferably 50 to 90%. First and second bundles of bristles are preferably arranged distributed across the roller surface alternatingly adjacent to one another on the roller surface. It is particularly preferred if the bundles of bristles are arranged offset, preferably distributed diagonally in arrow shapes across the surface.

A treatment of the surface using the surface brush is carried out without a support wheel or support wheels. Operators determine with their own applied force and the intrinsic weight of the device the contact pressure of the roller on the surface. For this reason, the subsequently described measures are necessary for the smooth running of the roller brush.

The diagonal arrangement of long bristles effects a uniform contact of the long bristles with the surface to be cleaned during operation. By this means, the polygon effect is virtually prevented, which may appear due to a radial oscillation of the brush during alternating contact of the following bundle of bristles with the surface to be treated. The diagonal arrangement of the long bundles of bristles leads to the fact that an axial force component allows the bristles to move laterally. In order to prevent this, the diagonal, long bristles are arranged in mirror symmetry to the center of the roller. The result of this combined arrangement is a track accurate processing with significantly reduced oscillations for the operator.

Decisive for preventing the polygon effect is that the bristles are arranged diagonally on the surface in arrow shapes. The diagonal arrangement ensures constant contact of the bristles on the surface. However, a straight running is no longer guaranteed due to the transverse forces that arise. This may be prevented by an arrow-shaped arrangement.

It is preferred if the bristles have different diameters or bristle thicknesses for different types of floors. The diameter of the bristles is preferred in the range from 0.2 to 1 mm. In the case of a wood application, the bristle diameter is approximately 0.4 to 0.6 mm. Soft bristles are designed for sensitive surfaces and light cleaning effects; hard bristles intensively clean more resistant surfaces. The bristles may have different lengths, but they do not have to. Thus, the length of the first bristles, the so-called short bristles, may lie in the range from 15 mm to 25 mm, preferably at 20 mm. The length of the second bristles, the so-called long bristles, may lie in the range from 20 mm to 30 mm, preferably at 25 mm.

The diameter of the roller body and bristles, the so-called roller diameter, is in the range of 70 to 120 mm, preferably 90 mm when the short bristles are used, and in the range from 80 to 130 mm, preferably 100 mm when the long bristles are used. All plastic materials may be used, such as in particular, polyamide, polypropylene, and also metals, in particular steel wire, coated and uncoated, and also stainless steel wire and brass wires, as material for the bristles.

In addition to the roller brush according to the invention, which enables cleaning of tile, natural stone, artificial stone, concrete block, stone, or wood flooring surfaces, the invention also provides a cleaning and maintenance device with this type of roller brush. The cleaning device is characterized in that it comprises a drive for driving the roller brush at 200 to 3000 rpm, preferably 600 to 1400 rpm. The speed preferably lies in the range 1000 to 1200 rpm.

Driving the roller brush in a cleaning and/or maintenance device may be carried in different ways. In a first embodiment of the invention, driving the brush is carried out axially via a positive connection, for example using a hexagon socket-shaft connection. In the case of the hexagon socket-shaft connection, the motor torque is transferred to the roller brush via a hexagonal shaft protruding on the working device. The roller brush with the hexagonal socket is only set on the shaft for this. It is alternatively possible that the roller brush is driven by a gear which is mounted externally on the shaft.

One disadvantage of the axial drive may be seen in that areas close to the edge may not be cleaned. In order to guarantee this, it may be provided in a refined embodiment that lateral brush head attachments are provided for the roller brush. These may preferably be connected on both sides to the roller brush using positive locking, for example, by screwing. With these types of brush head attachments, it is also possible to clean areas close to the edge. Furthermore, it may be provided the roller brush is segmented and individual segments are populated with different bristle types. The segments may then be pushed onto a shaft in a positive-locking way.

Another object of the invention is to provide a cleaning and maintenance device, in particular for joint and floor cleaning, which avoids the disadvantages of the prior art, is particularly easy to manufacture, may be stored in a space-saving way, and includes a plurality of usage applications.

This additional problem is solved in that a cleaning and maintenance device is designed with a motor housing which accommodates an electric motor and, if necessary, a transmission connected to the electric motor, and at least one drive shaft driven by the electric motor as a hand-held device.

A hand-held device is understood in the present application to be a device in which no fixed, predefined axis is defined to the surface to be processed, in particular floor surfaces, but instead this may be freely selected in certain ranges. According to the invention, the cleaning and maintenance device comprises a first and a second processing device which are designed in such a way that they are exchangeable and are drivable by the same drive shaft of the electric motor.

While the roller brush is attached parallel to the motor and symmetrical to the guide strut in order to guarantee a uniform introduction of force by the operator on the entire roller width, the joint brush is positioned on the motor axis off-center to the guide strut in the embodiment shown. A wheel on the opposite side of the joint brush ensures a stable position of the axis. The joint brush functions overwhelmingly with the intrinsic weight of the device. The advantage of this arrangement for joint cleaning is the low center of gravity of the device, which enables comfortable operating by the operator virtually free of vibrations.

The processing device is preferably configured in such a way that an exchange or swap of the first and second processing devices is possible without tools.

The exchange without tools is preferably carried out at the point of use of the joint and floor cleaning device. This is particularly preferred if the point of use is in an exterior area. It is particularly preferred if the change without tools is carried out without aids, merely by latching and unlatching. The latching may preferably be carried out using a slider which is attached on the motor housing.

It is more particularly preferred if not only the electric motor is accommodated in the motor housing, but also a transmission connected to the electric motor. The transmission transfers the speed of the drive shaft of the electric motor from, for example, approximately 16,000 rpm to approximately 1600 rpm at the output shaft of the transmission by means of an internal gearing. In such a case, the first and/or the second processing device is exchangeably connected to the drive shaft of the electric motor via the output shaft of the transmission.

In a first embodiment of the invention, the first processing device is a disk in the form of a joint brush. The disk is arranged axial to the motor shaft and non-symmetrical to the guide strut axis. The disk has a width in the range from 1 mm to 20 mm, preferably 10 mm to 16 mm, and essentially coincides with the width of the joints in a floor, e.g. a paved area in the exterior area.

In another embodiment of the invention, the second processing device is a roller, in particular in the form of a roller brush with a bristle surface. The roller is arranged parallel to the motor shaft and symmetrical to the guide strut axis. The roller brush may particularly preferably be equipped with at least two different bundles of bristles, as previously described.

According to the second embodiment, it is very easily possible to exchange different processing devices for one another, e.g. to exchange the joint brush for an areally working roller brush, as previously described. Different processing devices may then use the same resources, like the electric motor, transmission, shaft with handle, etc. By this means, a user may use a plurality of cleaning and maintenance devices simply by exchanging, preferably without tools, different processing devices, without having to provide different complete devices.

It is particularly preferred if the roller device is not directly connected to the output shaft of the transmission of the electric motor, but instead is connectable by means of a toothed belt drive.

Due to the toothed belt drive, it is possible to arrange the second processing device, i.e. the roller brush, centrally due to the higher required pressure forces to be introduced by the operator. A parallel arrangement of the brush axis to the motor axis is then particularly preferred. The toothed belt drive has the advantage over a transmission drive that it runs with less noise and damps oscillations due to the brush at the motor.

In order to be able to clean and maintain different surface textures and qualities of the surfaces to be treated using the roller brush, like pavement slabs with flat structures, rough pavement slabs (exposed aggregate concrete slabs), pavers, tiles, and different types of wood surfaces, different roller brushes with different bristle qualities and/or different bristle lengths are used. Stubborn dirt on rough surface structures may, for example, be best processed using hard bristles, and sensitive wood surfaces with soft bristles. In this case, brushes with bristles and a bristle thickness in the range from 0.4 to 1 mm are used, preferably in 0.1 mm increments.

In addition to cleaning, the invention of a cleaning device with a roller brush may also be used to maintain surfaces. For wooden decks, for example, maintenance oils are offered, which may be distributed uniformly on the wood using a soft brush.

Using the roller brush, wet cleaning and maintenance may also be carried out. In particular, surfaces previously wetted with water or cleaners may be better cleaned in the case of stubborn dirt than a dry treatment.

The working rotation direction and the first processing direction, i.e. of the joint brush and of the second processing device, i.e. the roller brush, is in each case in the drawing direction, i.e. the brush would pull the operator in the driving direction. The invention may preferably also reverse the direction of rotation. Pressure applied by the operator and the force on the bristles increases significantly. In this way, stubborn dirt or algae growth may be removed even better. A further effect is that the loosened dirt is conveyed in the direction of the operator.

It is particularly preferred if the second processing device comprises, in addition to the toothed belt drive which connects the output shaft of the transmission to the drive shaft of the electric motor, a bearing means on the opposite side. This bearing means is preferably designed in its thickness to be thinner than the transmission device and thus enables that edge areas, i.e. close to the edge, may also be cleaned using the roller device.

In a preferred embodiment of the invention, a shaft is provided for manually guiding the cleaning and maintenance device. In particular, in an advantageous embodiment of the invention of the cleaning and maintenance device, this is arranged substantially perpendicular to a flat, floor surface to be processed. In particular, the device according to the invention is characterized in that it has a shaft for manual guiding.

The manual guiding of the cleaning and maintenance device enables a close running up on difficult to access edges and corners, and thus cleaning close to the edge.

The shaft of the cleaning and maintenance device is preferably designed as a metal tube which is rigidly connected to the motor housing. The motor housing is preferably arranged in the center of the cleaning and maintenance device at an angle of 90° to the metal tube. A central arrangement has the advantage that a uniform force introduction by the operator is achieved on the entire roller surface without tilting the roller to the side.

Preferably, a universal motor may be used for mains operation and a permanent DC motor for accumulator operation.

These motors have a substantially lower weight with respect to asynchronous motors.

Preferably, the cleaning and maintenance device has a handle on the shaft for better guiding.

The cleaning and maintenance device may either be operated with a network voltage of 230 volts or independent of the mains with the aid or storage devices, particularly accumulators. The network connection is preferably located on the end of the shaft on which the handle is arranged. Alternatively, it is possible to accommodate the accumulators in the handle itself, for example to connect to a supply of 12 volts, 18 volts, 24 volts, or 36 volts.

In order to be able to transport the cleaning and maintenance device in a particularly space-saving way, the shaft is preferably designed as telescoping. The telescoping shaft has, in addition, the advantage that different working heights for different working attachments may be set.

In order to enable an active ventilation of the motor, the motor housing has ventilation slits for the intake of cold air and to discharge used air on the opposite side. In this way, overheating of the motor is prevented.

In order to prevent the operating personnel from being soiled by foreign bodies stirred up by the use of the hand-held cleaning and maintenance device, a protective hood is provided in a refined embodiment, which is preferably arranged in the area of the roller brush.

The protective hood of the roller brush is preferably lockable in five different stages so that different angles may be processed using the device.

BRIEF DESCRIPTION OF THE DRAWINGS

The invention will subsequently be described with the aid of the figures, without being limited to them:

FIGS. 3a-b show a top view of a roller brush;

FIGS. 5a-b show a segmented roller brush with brush attachments;

FIGS. 7a-b show a view of the cleaning and maintenance device in the area of the electric motor (FIG. 7a) or the roller brush (FIG. 7b);

FIG. 7d shows a view of the cleaning and maintenance device, cutaway in front with roller brush;

FIGS. 8a-b show a detail view of the joint brush;

FIG. 9 shows a detail view of a part of the roller brush.

DETAILED DESCRIPTION

Figure 1:
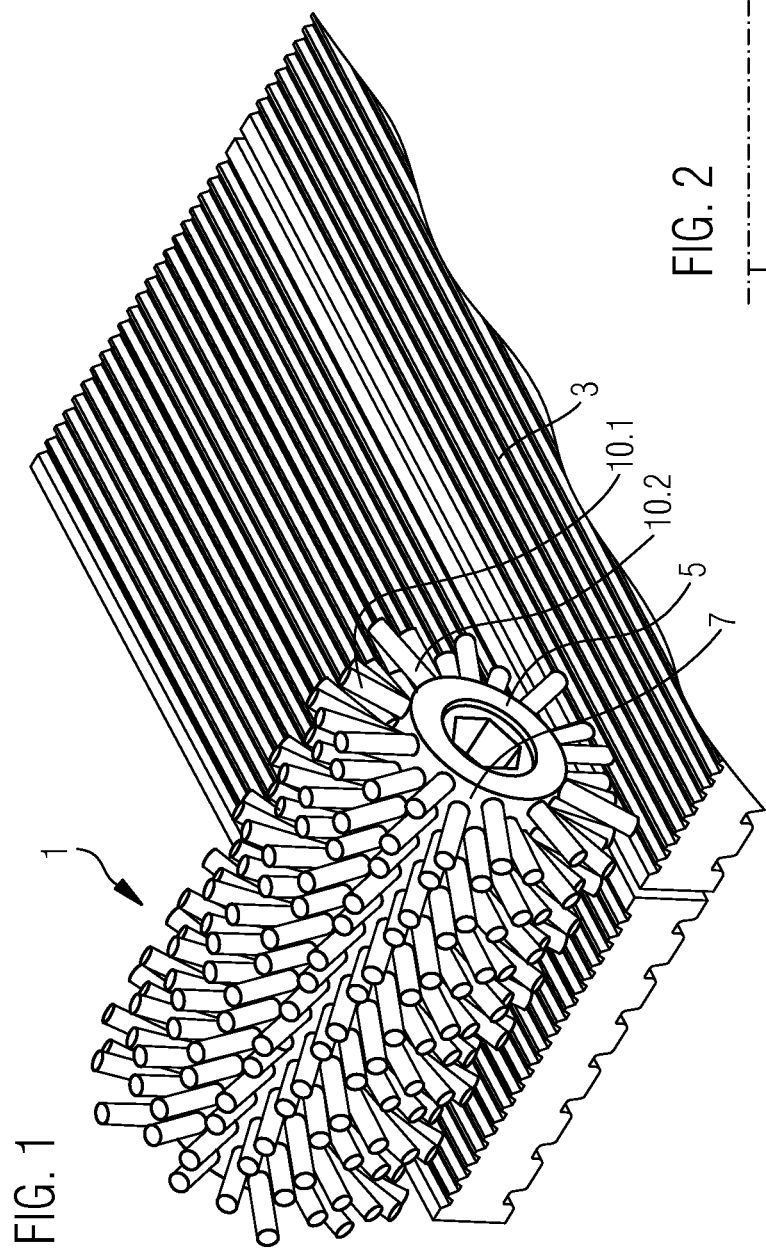
FIG. 1 shows a roller brush according to the invention, used for cleaning a wooden floor, in a three-dimensional view.

FIG. 1 shows a roller brush according to the invention according to a first aspect of the invention, which is used for cleaning a wood surface 3. Roller brush 1 according to the invention comprises a rotationally symmetrical cylinder 5 with a cylinder surface 7 into which a plurality of bundles of bristles is inserted. In the embodiment shown in FIG. 1, two types of bundles of bristles are inserted into the surface, a first bundle of bristles 10.1 and a second bundle of bristles 10.2. The bundles of bristles comprise a plurality of bristles, wherein the individual bristles may have a diameter from 0.2 to 1 mm. The roller brush comprises first bundles of bristles with first bristles, in particular for cleaning of wooden surfaces in the form of longitudinally profiled boards, as shown in FIG. 1. First bristles 10.1 are short bristles with diameters in the range from 0.5 to 1 mm, in particular, a diameter of 0.6 mm. The second bristles are long bristles with a diameter in the range of 0.2 to 0.8 mm, preferably a diameter of 0.4 mm. The roller diameter of the region provided with long bristles lies preferably in the range from 70 to 120 mm, preferably at 90 mm, and the roller diameter of the region provided with long bristles lies in the range from 80 to 130 mm, preferably at 100 mm.

The length of the short bristles lies, for example, at 20 mm, that of the long bristles at 25 mm, i.e. the length of the short bristles is approximately 80% of the length of the long bristles. In general, the length of the bristles lies in the range from 15 to 30 mm.

Figure 2:
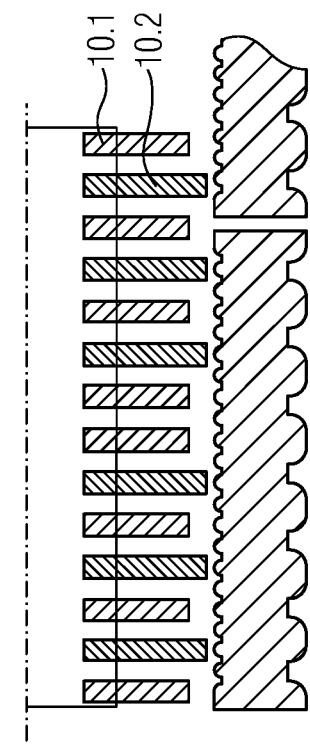
FIG. 2 shows a cutaway view of a roller brush according to the invention for cleaning a wood floor.

The different lengths of the bristles are especially clear in FIG. 2. In this case, the long bristles with a diameter of 0.4 mm are designated with 10.2 and the short bristles with a diameter in the range of 0.6 mm with 10.1.

All bristles are preferably manufactured from the same material, for example, from a plastic material, preferably polyamide.

Due to the use according to the invention of longer bundles of bristles with thinner bristles and shorter bundles of bristles with thicker bristles, as shown in FIGS. 1 and 2, the subsequently described cleaning effect results when the bundles of bristles are alternatingly uniformly distributed across the surface of the roller brush. Thus, the soft bristles, i.e. the longer bundles of bristles with thinner bristles, initially contact the floor and gently clean it. For stubborn dirt, a higher pressure may be exerted on the roller brush. This leads to the bristles yielding and the harder, shorter bristles come into contact with the surface and remove stubborn residual dirt which might not be removed using the soft first bristles.

The roller brush according to the invention is preferably used in a hand-held cleaning device which has an electric motor as a drive and which drives the roller brush at a speed of 600 to 1400 rpm. The speed is preferably in the range of 1000 to 1200 rpm. With the aid of the roller brush, it is possible to excellently remove filth, moss, and algae which accumulate over the course of time in the pores, preferably in the profiled grooves of the boards, from wooden surfaces, for example, wooden decks, in particular, after wet pre-treatment with water, soap solution, bleach, or algae remover, using a brush geometry according to the invention, as described.

FIGS. 3a and 3b show a top view on a roller surface according to the invention with two different bundles of bristles. FIG. 3a is a three-dimensional view. Identical components as in FIGS. 1 and 2 are provided with identical references. The different bristles are again designated with the references 10.1 and 10.2. As is clear from FIG. 3a, identical bristles are arranged along a line 20 in a diagonal direction on the roller body. The implementation of the surface according to FIG. 3b shows the arrangement of the different types of bristles in a regular structure, wherein the bristles are arranged in diagonals in arrow shapes across the surface. The roller brush preferably has an outer diameter between 80 and 120 mm, more preferably of 100 mm. The width of the roller brush contact surface lies between 120 and 300 mm, particularly preferably at 165 mm.

Figure 4A:
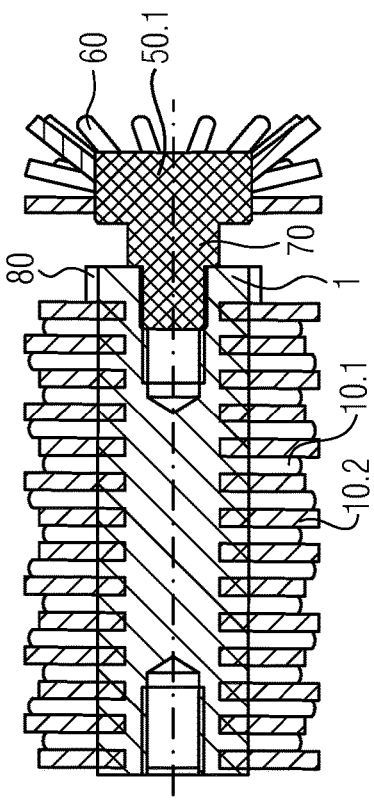
FIGS. 4a-c show a one-piece roller brush with laterally arranged brush attachments.
Figure 4B:
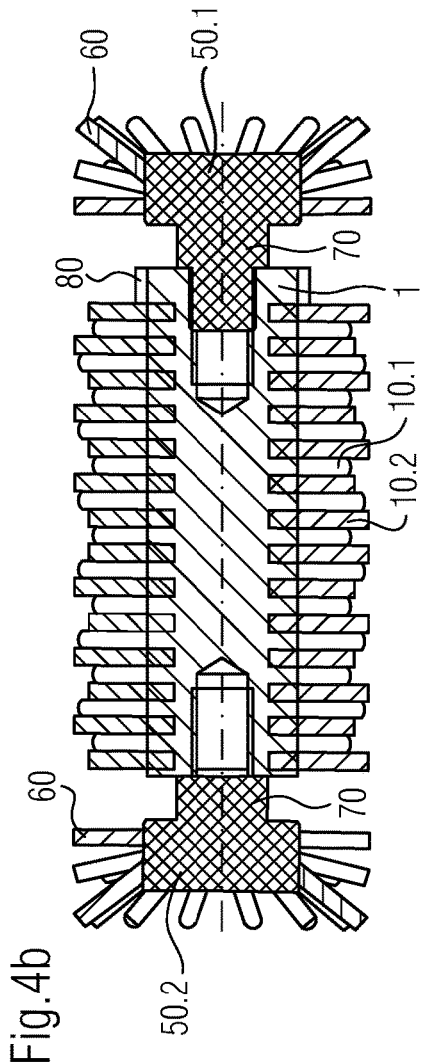
Figure 4C:
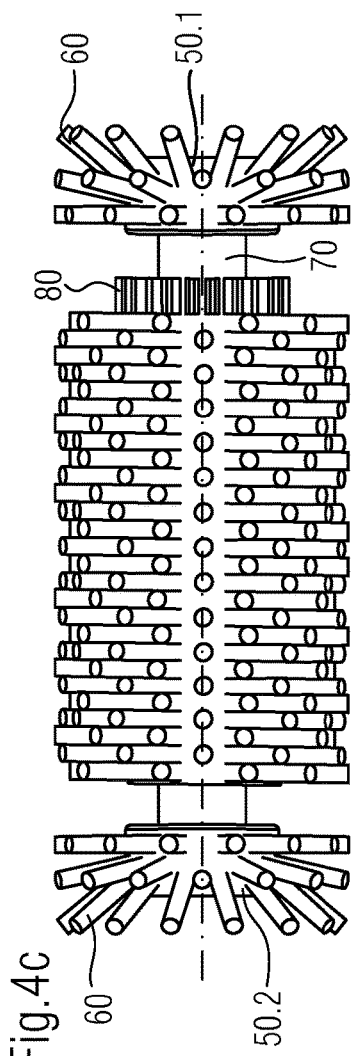

In FIGS. 4a through 4c, the embodiment of the roller brush according to the invention is shown with bristle attachments 50.1, 50.2, shown attached on the sides, which are connected in a positive locking way to the roller brush on one or both sides, for example, by a screw connection. Bristle attachments 50.1, 50.2 have bundles of bristles 60 positioned at exterior angles so that areas close to the edge may be completely covered by the bristles. A shaft shoulder 70 between roller brush 1 and respective attachments 50.1, 50.2 guarantees the mounting of the bristles. The drive may be carried out in an embodiment according to FIGS. 4a through 4c by a gear or a pulley 80 which is rigidly connected to the roller brush. An axial drive, as shown in FIG. 7b may only be carried out for single-sided bristle attachments.

FIGS. 5a and 5b show an alternative embodiment of the roller brush according to the invention. In this embodiment, the entire roller brush is divided into individual segments 100.1, 100.2, 100.3, 100.4, 100.5. As in the embodiment according to FIGS. 4a through 4c, bristle attachments are again provided. Individual segments 100.1, 100.2, 100.3, 100.4, 100.5 may be configured with different bundles of bristles. The bundles of bristles of the respective segments differ in their material selection in the embodiment shown. Thus, the bristles in segments 100.1, 100.3, 100.5 are, for example, bristles made from steel wire, and the bristles in segments 100.2, 100.4 are made from nylon wire. This type of mixture expands the cleaning force for the area to be treated. As already shown in FIGS. 4a through 4c, the drive of the roller brush is carried out via a gear or a pulley.

Four tests of cleaning using a device according to the invention are subsequently described. The device according to the invention is a roller brush with a rotationally symmetrical cylinder, which has two different bristles on its cylinder surface, first bristles and second bristles. The first and second bristles are made from polyamide and have the following dimensions:
First, short bristles: Diameter 0.6 mm, length 20 mm
Second, long bristles: Diameter 0.4 mm, length 25 mm
Test 1: Balcony Flooring, Thermal Treated Wood The test was carried out on a balcony flooring made from thermal treated (TMT) fir laid in 2004. The floorboards are grooved, the area is 1.1×2.6 m². The balcony has a western exposure and direct exposure to weathering. The surface was last cleaned in spring 2014 by scrubbing and mopping with soap solution. In 2013, the surface was maintained with a wood oil. This represents the typical case, in that the surface is cleaned once annually in late winter/spring before the garden or balcony season. The surface was not discolored by algae or mildew; the usual urban dust and dirt deposits were present.

A dry cleaning was initially carried out. The accumulated dirt could be partially removed; dust or dirt particles were not noticeably stirred up or propelled away. The cleaning effect was, however, low. The terrace floorboards were subsequently saturated with a mop and after 2 minutes of exposure time, they were brushed with the device according to the invention.

The cleaning effect was significantly greater. There was no damage to the surface. Two or three cleanings per year with the device according to the invention do not represent an unacceptable demand.
Test 2: Deck Flooring, Thermal Treated Fir Deck flooring made from TMT fir, grooved, and in use for 6 years, was cleaned in a damp state (after rain) without targeted wetting. The cleaned areas then dried very quickly; in contrast, the dirty area remained damp significantly longer.

The cleaning effect was estimated as good.
Test 3: Wood-Plastic-Composite Grooved Boards A test surface of 1.0×0.5 m², consisting of 3 wood-plastic-composite floorboard sections, was cleaned. The floorboards are grooved and brushed, painted medium brown, with a matrix of polypropylene, 70% wood. The test surface had a northern exposure for 4 years at a 45° inclination.

The cleaning was carried out dry and wet with an algae remover. The cleanser was applied saturated using a brush and the surface was wetted again after approximately 1 hour contact time.

Very good effects were shown already with the dry cleaning, and with the wet cleaning with the algae remover, the surface looked virtually new. Even the grooves were cleaned very well.
Test 4: Deck Flooring Test Surface, Different Woods The bristles were tested on different wooden surfaces of a test surface:

| Floorboard no. | Material |
|---|---|
| 477 | Bangkirai, untreated |
| 480 | Bangkirai, oiled |
| 483 | TMT ash, untreated |
| 486 | TMT ash, oiled |
| 489 | Oak, untreated |
| 492 | Oak, oiled |
| 495 | Pressure-treated spruce |
| 498 | Larch, untreated |
| 501 | Larch, oiled |
| 504 | Douglas fir, untreated |
| 507 | Douglas fir, oiled |
| 510 | Moso bamboo (compressed) |

For each material variant, 3 floorboard sections were installed, 700 mm in length and 130 mm width; each section was respectively cleaned, namely in thirds of the length, dry, wetted with pure water, and with water containing detergent; contact time approximately 2 min.

The cleaning effects was analogous to Test 1, i.e. dry had low effects, wet had good effects; the addition of cleanser (1 spray for 5 l) resulted in an improvement on some materials, which, however, was only visible after drying.

In contrast to all of the wood variants, which appeared significantly lighter after cleaning and drying, the bamboo appeared darker, apparently due to a smoothed surface.

In summary, it may be stated that the device according to the invention was tested on different flooring materials made from wood and wood-plastic-composite. All materials were located for many years exposed to the weather and thus represent the situation in practice very well. The woods were weathered and wood-discoloring fungi grew on them; the wood-plastic composite had algae growths.

While the cleaning effect on the tested woods is very low for dry cleaning, it is very good for wet cleaning. No damage was determined on the wood surfaces.

While a dry cleaning already provided good effects in the case of the algae growth on the wood-plastic composite, the effect in the case of wet cleaning and pre-treatment with an algae remover was significantly improved.

Unacceptable damage to the surfaces was not observed, even for sensitive materials, like pressure-treated or thermally modified fir. A certain amount of wear on the surface is, however, normal and necessary for achieving the cleaning effect.

As shown, the rotating roller brush may free hard floor surfaces from stubborn contaminants due to the hardness of the bristles. The hard bristles have essentially the function of a scrubber, in contrast to previous systems, which instead had the sweeping function of a broom. Using the roller brush according to the invention, stone terraces and pavement slabs in the exterior area, and also tile and natural stone surfaces, for example, granite, may be processed. In particular, it is possible to free smooth and structured wood surfaces, in particular wooden decks in the exterior area, from moss and algae residue pore deep. The uniform distribution of different lengths and different hardnesses of bundles of bristles on the roller surface leads to a two-stage cleaning effect.

Figure 6A:
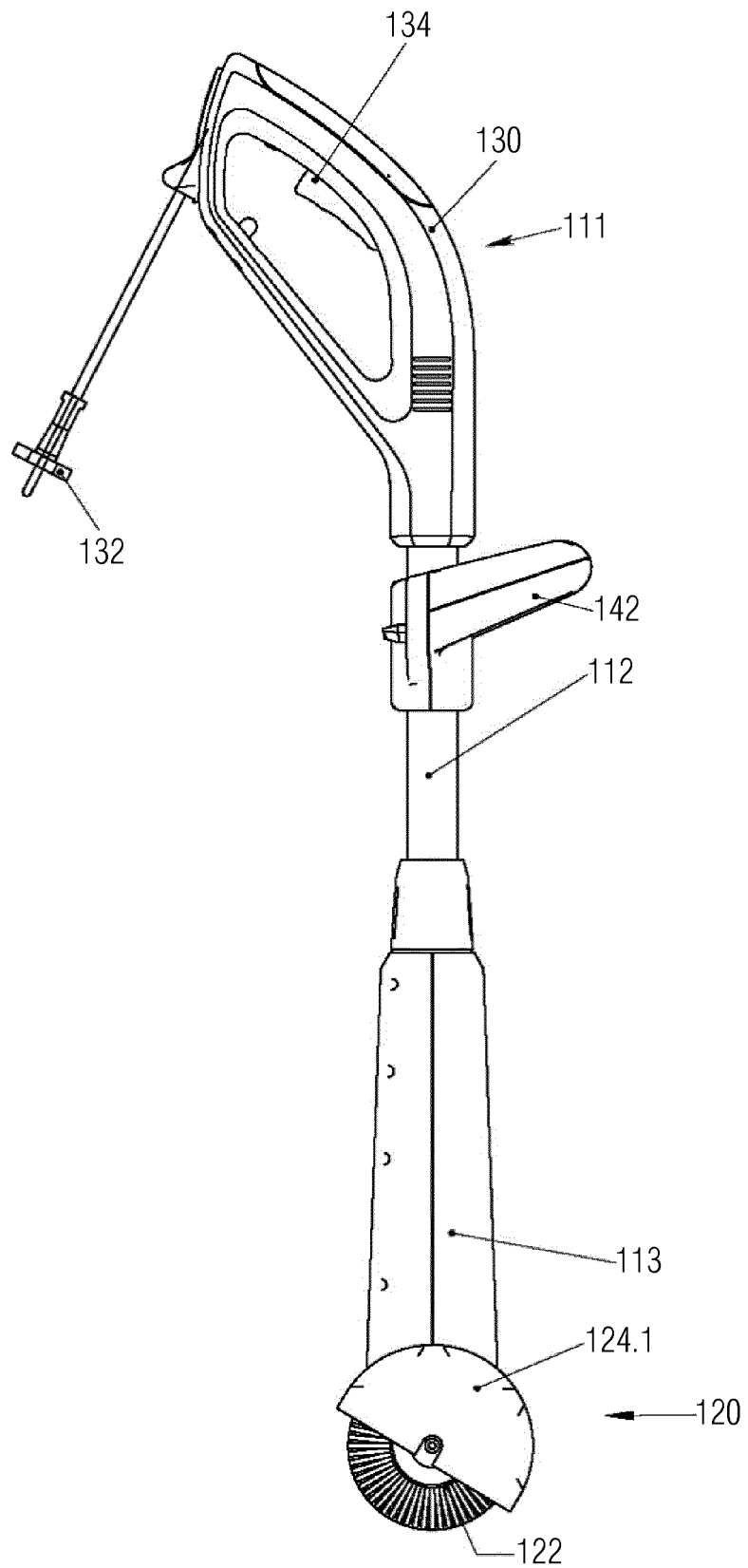
FIG. 6a shows a side view of a cleaning and maintenance device with a joint brush as a floor processing device.

FIG. 6a is a side view of a cleaning and maintenance device according to a second aspect of the invention.

Figure 6B:
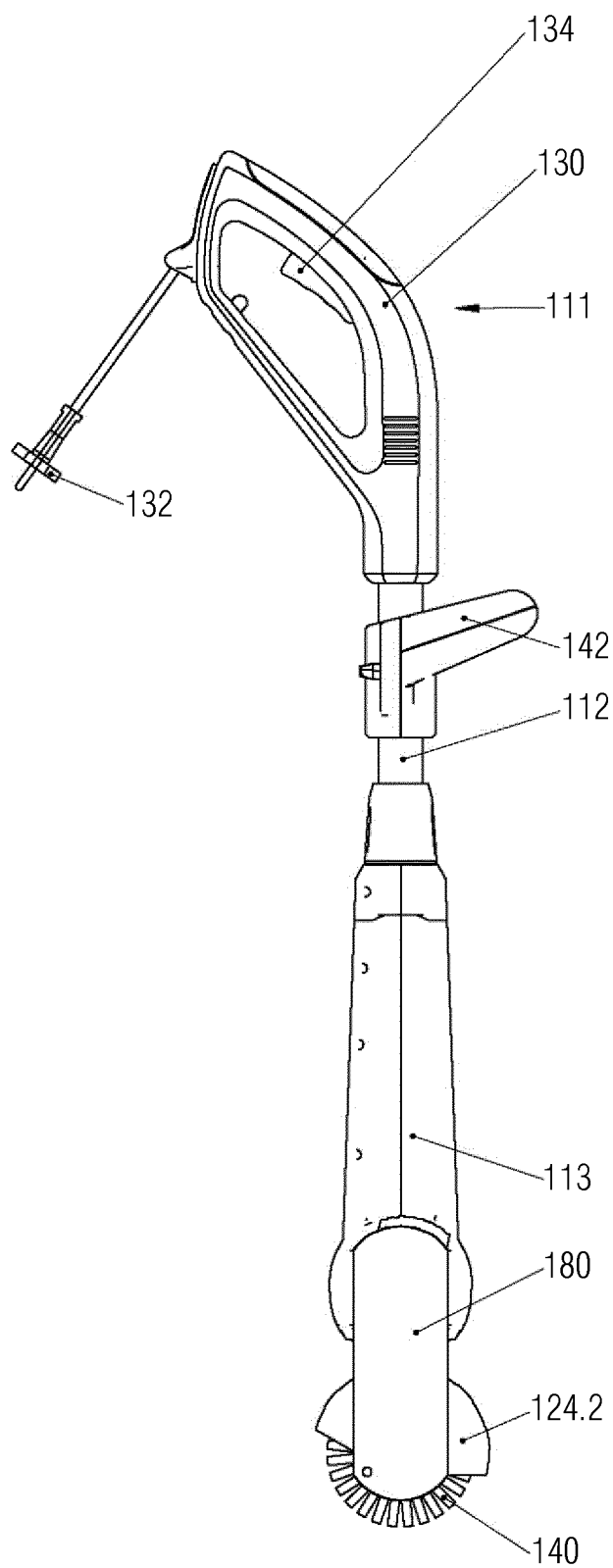
FIG. 6b shows a side view of the cleaning and maintenance device with a roller brush as a floor processing device.

FIGS. 6a and 6b show cleaning and maintenance devices with a joint brush (FIG. 6a) and a roller brush (FIG. 6b). The cleaning and maintenance device essentially comprises a shaft 112, a motor housing 113 with a motor and transmission accommodated therein (which are not shown) for driving the respective processing device. According to the invention, the cleaning and maintenance device 111 is handheld, for which purpose shaft 112 functions. Shaft 112 is preferably designed as a metal tube, wherein the metal tube is connected to motor housing 113, and is, for example, telescoping.

FIG. 6a shows a side view, in which a joint disk 122, which is driven by the electric motor accommodated in motor housing 113, is quite clear as first processing device 120. The cover hood 124.1 is also clearly visible, which protects the operator from dirt particles that are stirred up.

Joint disk 122, which is also designated as a joint brush, is shown in detail in FIGS. 8a and 8b.

A handle 130 is preferably arranged on the opposite end of shaft 112 from motor housing 113. Handle 130 has a plug socket 132, which functions as a mains connection in the currently shown embodiment. In order to start up and stop operation of the cleaning and maintenance device, an on/off switch 134 is arranged on the handle. A cable connection, laid in shaft 112, leads from mains connection 132 arranged on the handle and from the electric motor, which is preferably designed as a universal motor, arranged in motor housing 113.

Ventilation slits (not shown) may be arranged on the under side of motor housing 113. Air may be sucked in through these ventilation slits and discharged through opposing ventilation slits, so that the motor accommodated in housing 113 is cooled.

Instead of the mains connection depicted, an accumulator, e.g. for 12 volts, 18 volts, 24 volts, or 36 volts of power supply voltage, may be provided. However, these variants are not currently shown.

Optionally, an additional handle 142, which is may be designed to be detachable, may be arranged on shaft 112 for better guidance.

By switching the on/off switch 134, the motor and the transmission connected thereto and thus the processing device is set into rotation. According to the embodiment shown, the rotational movement from the electric motor, which is accommodated in motor housing 113, is thereby transmitted to a motor shaft, then to the transmission connected thereto, and from the output shaft of the transmission to the respective processing device, currently the joint brush or the roller brush.

Another variant of the cleaning and maintenance device is shown in FIG. 6b, which is obtained in that the base device, which comprises shaft 112, motor housing 113 with electric motor and transmission accommodated therein, and handle 130, now drives a roller in the form of a roller brush 140. The drive is carried out using the same electric motor and transmission as is carried out in FIG. 6a for driving joint brush 122. The roller brush may be, however it does not have to be, a roller brush according to FIGS. 1 through 5b. Roller brushes according to FIGS. 1 through 5b are advantageous as they permit a particularly good cleaning of floor surfaces.

Joint brush 122 in the form of a disk, in particular a wire disk according to FIG. 6a, is arranged on the same axis line as the motor- and transmission shafts. The joint brush is thus arranged off center to the guide tube.

Although an off center arrangement of the roller brush would also be possible, this would have the disadvantage that the relatively widely designed roller brush tends to tumble and impedes handling.

Therefore, the second processing device in the form of a roller brush, as shown in FIG. 6a, is arranged centered. The brush axis is then parallel to the motor axis, which enables the introduction of higher pressure forces. The drive of the roller brush is then carried out via a belt drive, specifically in this case a toothed belt devices 180. The toothed belts in the toothed belt device have the advantage over a transmission in that they run at low noise and damp oscillations due to the roller brush at the motor. The conversion of the processing device shown in FIG. 6a with a joint brush 122 to the processing device shown in FIG. 6b with a roller brush 140 is carried out by the simple exchange of the respective processing device 122, 140, which after the exchange is connected to one and the same drive shaft of the electric motor via the transmission connected thereto. The exchange is preferably carried out without tools through a simple insertion and unplugging of the respective processing device on the transmission output shaft, which is connected to the electric motor. Latching and unlatching devices are provided for safety.

Identical components as in FIG. 6a are provided with identical references in FIG. 6b.

Figure 7C:
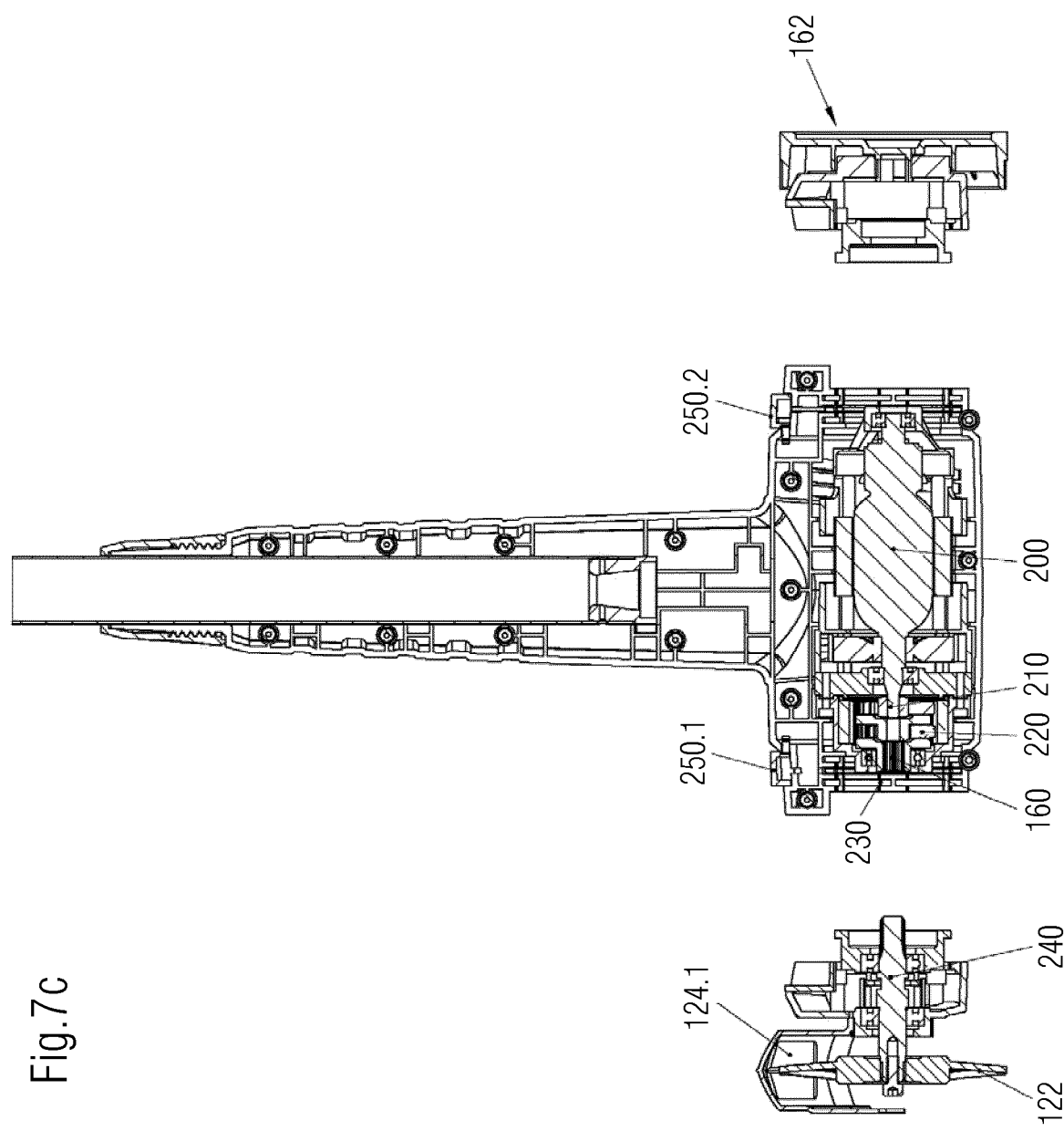
FIG. 7c shows a view of the cleaning and maintenance device, cutaway in front, with joint brush.

FIG. 7a initially shows the part of the hand-held cleaning and maintenance device, which is the same for both variants, which are shown in FIGS. 6a and 6b and FIGS. 7a and 7b. This is shaft 112 with motor housing 113, which connects thereon and in which the electric motor and the transmission (not shown) are accommodated. The housing is shown closed in FIGS. 7a and 7b. FIGS. 7c and 7d show a cutaway.

As shown in FIG. 7a, motor housing 113 preferably comprises two plastic half shells which enclose the motor. The two plastic half shells are connected to one another using screws.

In FIGS. 7a and 7b, the different processing devices, which may be driven by the electric motor accommodated in motor housing 113, are shown.

In the depiction of the electric motor, which is common to both the cleaning and maintenance device in motor housing 113 according to FIG. 7a, only the transmission output shaft 160 is shown, which, in the case of FIG. 7a and the first cleaning and maintenance device shown in the form of a joint brush, is directly driven from shaft 160 by the connection, preferably without tools, of joint brush 122.

Furthermore, cover 124.1 of joint brush 122 is visible, which prevents the distribution of dirt particles.

The drive of joint brush 122 is carried out, as previously mentioned, directly via transmission output shaft 160 so that the speed of the joint brush corresponds to the speed of the transmission output shaft. The speed lies in the range of 800 rpm to 2000 rpm, preferably at 1600 rpm, and thus enables an efficient removal of noxious plants, moss, and dirt from the joints between stone slabs and paving stones. The translation from the high-speed electric motor to the speed of 800 rpm to 2000 rpm is carried out preferably by a planetary gear transmission.

The joint brush is currently essentially configured as a disk shape, wherein the disk has a width B. The disk is preferably a disk which is populated with bristles and is shown in detail in FIGS. 8a and 8b. The width B of the joint disk corresponds essentially to the width of the joints and lies preferably between 1 mm and 20 mm.

In order to be able to safely guide the hand-held device on the ground, a guide device, in particular in the form of a guide wheel 162, is provided on the opposite side of the transmission from output shaft 160 in the configuration with the joint brush.

FIG. 7b shows an alternative processing device, which may be operated using the cleaning and maintenance device according to the invention. This is carried out simply by placing an alternative processing device on output shaft 160 of the transmission which is accommodated in motor housing 113. In this case, this is a roller in the form of a roller brush 140 with a bristle surface 172, which currently comprises a plurality of bristles 174.

Preferably, the cleaning and maintenance device may comprise different roller brushes. Roller brushes with different thicknesses of bristles may hereby be exchanged. This has the advantage that the bristle surface may be selected corresponding to the nature of the floor to be cleaned, for example, a tile, stone, marble, concrete block, natural stone, artificial stone, or wooden flooring.

The thickness of the bristles varies according to the surface conditions from 0.4 mm to 1 mm, preferably in 0.1 mm increments. A table will be subsequently provided, from which it may be gathered which bristle thickness is suitable for which floor surfaces.

The cleaning results were surprising for the person skilled in the art and not predictable, since the cleaning result did not depend on the bristle thickness alone, but also on the rotational speed of the roller surface, which lies preferably below the conventional 3000 rpm of the state of the art, preferably between 800 rpm and 2000 rpm, particularly preferably at approximately 1600 rpm.

Subsequent cleaning results in Table 1 related to speeds of the roller brush in the range of 1600 rpm.

TABLE 1

| | Dry cleaning results | | |
|---|---|---|---|
| | Coarse pavement | Fine pavement, natural stone, concrete, tile | Wooden deck, profiled |
| Bristle diameter 0.4 mm | | | |
| Surface cleaning | − | − | ++ |
| Penetration depth into intermediate spaces | − | + | ++ |
| Smearing/Smudging | − | − | + |
| Residue | −− | + | + |
| Bristle diameter 0.5 mm | | | |
| Surface cleaning | − | − | − |
| Penetration depth into intermediate spaces | −− | + | ++ |
| Smearing/Smudging | −− | −− | + |
| Residue | −− | −− | − |
| Bristle diameter 0.6 mm | | | |
| Surface cleaning | + | + | ++ |
| Penetration depth into intermediate spaces | ++ | ++ | ++ |
| Smearing/Smudging | −− | − | + |
| Residue | + | + | ++ |
| Bristle diameter 0.7 mm | | | |
| Surface cleaning | + | + | − |
| Penetration depth into intermediate spaces | ++ | ++ | ++ |
| Smearing/Smudging | + | + | + |
| Residue | + | + | + |
| Bristle diameter 1.0 mm | | | |
| Surface cleaning | + | + | ++ |
| Penetration depth into intermediate spaces | ++ | ++ | −− |
| Smearing/Smudging | ++ | ++ | −− * |
| Residue | ++ | ++ | + |

\* abrasive on wooden surfaces
+good cleaning result
++very good cleaning result
−poor cleaning result
−−very poor cleaning result In FIG. 7b, toothed belt device 180 is clearly visible, which currently is designed as a toothed belt drive and transmits the rotations of transmission output shaft 160 to mounting pin 190, on which the roller brush is placed and which functions to drive the roller brush parallel to the motor shaft.

Furthermore, bearing means 1000 is clear in FIG. 7b, which functions to position roller brush 140 centered with respect to electric motor 113 in a positive locking way between shaft stubs 305 (FIG. 7d).

The guide device or bearing means 1000 is arranged opposite toothed belt device 180. As is clear from FIG. 7b, the width BU of the toothed belt device is designed as significantly larger than the width BF of the guide device or bearing means 1000, which accommodates shaft 190 on which roller brush 140 is applied. This means that bearing means 1000 is substantially thinner than toothed belt device 180. This enables that, in the case that cleaning is carried out with the roller in the form of a roller brush 140, that roller brush 140 may be moved into areas close to the edge, and thus a trend towards a good cleaning in the areas close to the edge is carried out.

In the configuration according to FIG. 7b, roller brush 140 is applied on a hexagonal shaft journal 190 and driven by the same. This is a version of the configuration of a shaft for driving roller brush 140. Alternative to the coupling, a through shaft may be used.

In FIGS. 7c and 7d, views are shown as in FIGS. 7a and 7b; however these are cutaway views from below, from which the components accommodated in housing 113, for example, are visible. Identical designations as in FIGS. 7a and 7b have identical references in FIGS. 7c and 7d.

FIG. 7c is analogous to FIG. 7a in a cutaway view. Electric motor 200, accommodated in the housing is clearly visible, drive shaft 210 of which functions on a transmission 220 in the form of a planetary transmission, such that a translated speed of 800 to 2000 rpm, preferably approximately 1600 rpm is provided at the transmission output 230 using the transmission output shaft, which transmits the force from the electric motor to joint brush 122 via the transmission by snapping on toothed shaft 240 of the drive for joint brush 122. In order to securely connect joint brush 122 to the output shaft of the transmission, sliders 250.1, 250.2 are provided as latching and unlatching devices for retaining, by means of which the processing device may be latched and unlatched. Guide wheel 162, arranged on the opposite side of joint brush 122, is also clearly visible.

The identical component is shown in FIG. 7d as in FIG. 7b, which corresponds for both cleaning devices, in this case housing 113 with the shaft in a cutaway view, so that electric motor 200 and transmission 220 are visible. Identical components as in FIG. 7c are provided with identical references.

Guide device 1000 and toothed belt device 180 are clearly visible in the cutaway in FIG. 7d. Toothed belt device 180 has a toothed belt 300 with a toothed shaft 310. The input shaft in toothed belt device 80[sic:180], which directly contacts the transmission output shaft or transmission output shaft 60[sic:160], is designated with 240 as in FIG. 2c[sic:7c]. Toothed shaft 310 is provided with a shaft stub 305.1 designed as hexagonal, which drives the roller brush via a hexagonal socket 320. Opposite shaft stub 305.1 is another shaft stub 305.2 designed as hexagonal and arranged with a suitable hexagonal socket 330. Shaft stubs 305.1, 305.2 then guide the roller brush in a positive locking way.

FIG. 8a shows a side view of a joint brush 122. Joint brush 122 comprises a core 500, which is preferably designed from metal or a plastic material. Shaft 240 from FIG. 7c engages with this core 500 and latches onto five or more teeth 510.1, 510.2, 510.3, 510.4, 510.5 in a positive locking way.

Joint brush 122 comprises bristles 600 which are compressed with one another by two sheet metal disks 501, 502 held by a ring 503. Bristles 600 and their arrangement on inner-lying components 503, 501, 502 is shown in detail in FIG. 8b. The diameter of the joint brush is currently 110 mm, width B is 12 mm. The diameter of the joint brush may lie in the range from 50 mm to 150 mm, preferably at 110 mm. The bristles are selectively made from nylon with a diameter from 0.5-1.5 mm, or galvanized or brass-plated steel wire, or stainless steel wire or brass wire with a diameter from 0.2-0.8 mm, preferably 0.35 mm. During tests, it has been shown that nylon bristles have an increased wear when used on concrete blocks and natural stone surfaces, by which means the durability of the bristles are significantly limited over steel wire. Furthermore, tests have shown that brass-plated steel wire has a higher durability than stainless steel. Furthermore, thin bristles may easily bend in operation, by which means the bristle width is expanded and the joints may no longer be cleaned deeply enough. Thick bristles, however, lead to damage to the surface to be cleaned.

FIG. 9 shows a top view of a roller brush 140 without bristles. The roller brush comprises holes 700, into which bundles of bristles with bristles of different thicknesses from 0.4 mm to 1 mm are stuffed, resulting in roller brushes with different roller surfaces. The width of the roller surface provided with bristles varies from 20 to 400 mm, preferably 120 to 180 mm. Roller brushes with a width of 300 mm are also conceivable. Naturally, it is also possible to incompletely populate holes 700 of roller brush 140. It is thus possible to obtain a nonsymmetrical roller surface. It is also possible that the bristle length of the individual bundles of bristles varies across the roller surface.

With the invention, initially a cleaning and maintenance device is specified that enables both dry and also wet cleaning and the processing of the most varied floorings or flooring surfaces using one and the same cleaning and maintenance device through the simple exchange of floor processing devices. Furthermore, the most varied surfaces may be cleaned and maintained by exchanging the roller brushes.

The invention claimed is:

1. A hand-held cleaning and maintenance device for floorings, including tile floorings or wooden floorings, comprising:
a motor housing which accommodates at least an electric motor coupled to a transmission, the transmission having an output shaft, wherein the cleaning and maintenance device comprises at least two processing devices, the at least two processing device, including first and second processing devices designed and configured to be exchangeably attached to the hand-held cleaning and maintenance device without tools, and configured to be driven by the transmission output shaft, and wherein the second processing device comprises a roller brush having a cylinder surface, the roller brush connectable to the transmission output shaft;
wherein the first processing device comprises a disk in the form of a joint brush, the joint brush including a wire disk and a guide wheel, the wire disk configured to be connected directly to the transmission output shaft; and
wherein the roller brush includes a toothed belt drive configured to connect the roller brush to the transmission output shaft.

2. The hand-held cleaning and maintenance device according to claim 1, wherein the roller brush is designed to be exchangeable with different brush surfaces, further wherein the second processing device comprises a bearing means for the roller brush lying opposite the toothed belt drive.

3. The hand-held cleaning and maintenance device according to claim 1, characterized in that the cleaning and maintenance device has a shaft for held-held use, wherein the shaft has an adjustable length, and is rigidly connected to the motor housing.

4. The hand-held cleaning and maintenance device according to claim 1, characterized in that the cleaning and maintenance device has a mains connection or an electrical storage device.

5. The hand-held cleaning and maintenance device according to claim 1, characterized in that the cleaning and maintenance device comprises a protective hood in the area of the roller brush.

6. The hand-held cleaning and maintenance device according to claim 1, characterized in that the cleaning and maintenance device comprises latching and unlatching devices in the area of the motor housing configured for the exchange of the first and the second processing device without tools.

7. The hand-held cleaning and maintenance device according to claim 1, wherein the roller brush includes first bristles having a first diameter and first length and second bristles having a second diameter and second length, wherein at least one of the first and second diameter and the first and second lengths are different.

8. The hand-held cleaning and maintenance device according to claim 1, wherein the roller brush includes first and second bundles of bristles, the first bundle of bristles having a first length and the second bundle of bristles having a second length and the first length is shorter than the second length.

9. The hand-held cleaning and maintenance device according to claim 1, characterized in that the first length lies in the range of 50% to 98% of the second length.

10. The hand-held cleaning and maintenance device according to claim 8, characterized in that the length of the first and/or the second bristles lies in the range from 15 mm to 30 mm.

11. The hand-held cleaning and maintenance device according to claim 1, wherein the roller brush includes first and second bundles of bristles arranged alternatingly adjacent to one another across the cylinder surface, and arranged offset as diagonals across the cylinder surface.

12. The hand-held cleaning and maintenance device according to claim 1, wherein the roller brush includes first and second bristles, the first and second bristles having a first and second diameter and the first and/or second diameters lie in the range from 0.2 through 1 mm.

13. The hand-held cleaning and maintenance device according to claim 1, characterized in that the roller brush comprises at least one bristle attachment with bundles of bristles arranged at external angles.

14. The hand-held cleaning and maintenance device according to claim 1, characterized in that the roller brush comprises a plurality of segments with different bundles of bristles in different segments.

15. The hand-held cleaning and maintenance device according to claim 1, wherein the roller brush includes first and second bundles of bristles, wherein a first material of the first bundles of bristles and a second material of the second bundle of bristles is one of the following materials:
   a polyamide or polypropylene; or
   a steel wire or a stainless steel wire.

16. The hand-held cleaning and maintenance device according to claim 1, wherein the roller brush includes at least a first plurality of first bundles of bristles with first bristles and a second plurality of second bundles of bristles with second bristles arranged on the cylinder surface, characterized in that the first bundles of bristles are different from the second bundles of bristles.

* * * * *